US012732920B2

(12) United States Patent
Zheng et al.

(10) Patent No.: US 12,732,920 B2
(45) Date of Patent: Sep. 8, 2026

(54) ENHANCEMENTS ON TRANSMISSION POWER ADAPTATION

(71) Applicant: Nokia Technologies Oy, Espoo (FI)

(72) Inventors: Naizheng Zheng, Beijing (CN); Daniela Laselva, Klarup (DK); Amol Dhere, Gistrup (DK); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/044,687

(22) Filed: Feb. 4, 2025

(65) Prior Publication Data

US 2026/0122583 A1 Apr. 30, 2026

Related U.S. Application Data

(63) Continuation of application No. PCT/CN2022/110669, filed on Aug. 5, 2022.

(51) Int. Cl.
*H04W 52/36* (2009.01)
*H04W 52/14* (2009.01)

(52) U.S. Cl.
CPC ......... *H04W 52/36* (2013.01); *H04W 52/143* (2013.01)

(58) Field of Classification Search
CPC . H04W 52/36; H04W 52/143; H04W 52/367; H04W 52/32; H04W 52/146
See application file for complete search history.

(56) References Cited

U.S. PATENT DOCUMENTS 8,948,158 B2 2/2015 Cai et al.
9,295,041 B2 3/2016 Cai et al.
(Continued)

FOREIGN PATENT DOCUMENTS

CN 108632967 A 10/2018
EP 2555558 A1 6/2013
(Continued)

OTHER PUBLICATIONS

Vivo, "Other enhancements for simultaneous operation of child and parent links," 3GPP TSG RAN WG1 #106bis-e, R1-2108996, Oct. 11-19, 2021.
(Continued)

*Primary Examiner* — John J Lee
(74) *Attorney, Agent, or Firm* — McCarter & English, LLP

(57) ABSTRACT

Example embodiments of the present disclosure relate to devices, methods, apparatuses and computer readable storage media for transmission power adaptation. The method includes: receiving, at a first device and from a second device, a channel state information configuration; and in response to receiving a reference signal from the second device, transmitting to the second device a channel state information report based on the channel state information configuration, the channel state information report including assistance information on transmission power adjustment for the second device. In this way, the adjustment of transmission power and bandwidth assignment can be implemented without degrading the supported multiple input multiple output layers. Thus, the spectral efficiency is improved, while the data latency and network energy consumption are reduced.

28 Claims, 5 Drawing Sheets

(56) References Cited

U.S. PATENT DOCUMENTS

| | | | | |
|---|---|---|---|---|
| 9,331,832 | B2 | 5/2016 | Lindbom et al. | |
| 9,622,194 | B2 | 4/2017 | Liang et al. | |
| 9,955,374 | B2 | 4/2018 | Nammi et al. | |
| 10,454,651 | B2 * | 10/2019 | Yi | H04B 17/24 |
| 10,470,136 | B1 | 11/2019 | Ghosh et al. | |
| 10,536,959 | B2 | 1/2020 | Barabell et al. | |
| 10,602,496 | B2 | 3/2020 | Davydov et al. | |
| 10,945,270 | B2 | 3/2021 | Bi et al. | |
| 11,722,966 | B2 | 8/2023 | Liu et al. | |
| 11,778,570 | B2 | 10/2023 | Abedini et al. | |
| 12,068,824 | B2 | 8/2024 | Kim et al. | |
| 12,096,371 | B2 | 9/2024 | Abotabl et al. | |
| 12,289,687 | B2 | 4/2025 | Abotabl et al. | |
| 2010/0074131 | A1 | 3/2010 | Onggosanusi et al. | |
| 2021/0297123 | A1 | 9/2021 | Li et al. | |
| 2022/0386242 | A1 | 12/2022 | Abotabl et al. | |
| 2023/0016972 | A1 * | 1/2023 | Liu | H04W 52/367 |
| 2023/0345386 | A1 * | 10/2023 | Abotabl | H04W 52/143 |

FOREIGN PATENT DOCUMENTS

| | | | |
|---|---|---|---|
| JP | 6832825 | B2 | 2/2021 |
| WO | WO 2021/208007 | A1 | 10/2021 |
| WO | WO 2022/089757 | A1 | 5/2022 |
| WO | WO 2022/152582 | A1 | 7/2022 |

OTHER PUBLICATIONS

Vivo, “Remaining issues on other enhancements for simultaneous operation of child and parent links,” 3GPP TSG RAN WG1 #107-e, R1-2111034, Nov. 11-19, 2021.

Vivo, “Other enhancements for simultaneous operation of child and parent links,” 3GPP TSG RAN WG1 #106-e, R1-2106618, Aug. 16-27, 2021.

5G; NR; Radio Resource Control (RRC); Protocol specification (3GPP TS 38.331 version 17.1.0 Release 17), (Aug. 2022).

3GPP TSG RAN WG1 #109-e, Discussion on network energy saving techniques, R1-2204319 e-Meeting, May 9-20, 2022.

3GPP TSG RAN WG1 #106bis-e, Other enhancements for simultaneous operation of child and parent links, R1-2108996 e-Meeting, Oct. 11-19, 2021.

3GPP TSG RAN WG1 Meeting #68, Signaling support for non-zero transmission power ABS, R1-120888, Dresden, Germany, 6th-10th, Feb. 2012.

3GPP TSG RAN WG1 Meeting #110-e, R1-220xxxx, Toulouse, Aug. 22-26, 2022.

5G; NR; Physical layer procedures for data (3GPP TS 38.214 version 17.2.0 Release 17); (Jul. 2022).

3GPP TSG RAN WG1 #109-e, Discussion on physical layer techniques for network energy savings, R1-2204629, e-Meeting, May 9-20, 2022.

3GPP TSG RAN WG1 Meeting #108-e, Remaining issues on enhancements for simultaneous operation of MT and DU, R1-2200927 e-Meeting, Feb. 21-Mar. 3, 2022.

3GPP TSG RAN WG1 #105-e, Discussions on other enhancement for simultaneous operation, R1- 2105494, e-Meeting, May 10-27, 2021.

3GPP TSG RAN WG1 Meeting #106bis-e, Enhancements for simultaneous operation of MT and DU, R1-2108766, e-Meeting, Oct. 11-19, 2021.

3GPP TSG RAN WG1 Meeting #109-e, Summary #1 of [109-e-R17-eIAB-01], R1-2205283 May 9-May 20, 2022.

3GPP TSG RAN WG1 Meeting #109-e, Remaining issues on R17 IAB enhancements, R1-2203078, e-Meeting, May 9-20, 2022.

3GPP TSG-RAN2 Meeting#105, CR on periodicities of NZP CSI-RS resources, R2-1901449, Athens, Greece, Feb. 25-Mar. 1, 2019.

3GPP TSG RAN WG1 Meeting #68, On signalling for reduced power ABS, R1-120285, Dresden, Germany, Feb. 6-10, 2012.

3GPP TSG RAN WG1 #106b-e, Discussion on Rel-17 UL switching, R1-2110163, e-Meeting, Oct. 11-19, 2021.

* cited by examiner

ENHANCEMENTS ON TRANSMISSION POWER ADAPTATION

CROSS REFERENCE TO RELATED APPLICATION

This application is a continuation of International Patent Application Number PCT/CN2022/110669 filed Aug. 5, 2022, which is hereby incorporated by reference in its entirety.

FIELD

Embodiments of the present disclosure generally relate to the field of telecommunication and in particular, to devices, methods, apparatus and computer readable storage media for transmission power adaptation.

BACKGROUND

The radio access network (RAN) consumes most of the total energy consumption in the network. Currently, the downlink (DL) transmission power, for example, power spectral density per resource element (RE)/physical resource block (PRB) is fixed by the gNB for all UEs in a cell. For the sake of network energy saving, DL transmission power adaptation is used by the network, for example, on the physical downlink shared channel (PDSCH). Furthermore, in some cases, the bandwidth is jointly adapted with the transmission power. This instead means that the transmission power of the PDSCH would change dynamically according to the UE channel quality. In other words, different power spectral densities may be used for different PRBs scheduled to different UEs.

According to some communication solutions, a dynamically changing power level on PDSCH would inevitably affect the UE's derivation of a channel state information (DCI) feedback as well as several internal receiver settings of the UE. Therefore, the transmission power adaptation needs to be improved for both the network and the UE.

SUMMARY

In general, example embodiments of the present disclosure provide a solution of transmission power adaptation.

In a first aspect, there is provided a first device. The first device comprises at least one processor; and at least one memory including computer program codes; the at least one memory and the computer program codes are configured to, with the at least one processor, cause the first device at least to: receive, from a second device, a channel state information, CSI, configuration; and in response to receiving a reference signal from the second device, transmit to the second device a CSI report based on the CSI configuration, the CSI report comprising assistance information on transmission power adjustment for the second device.

In a second aspect, there is provided a second device. The second device comprises at least one processor; and at least one memory including computer program codes; the at least one memory and the computer program codes are configured to, with the at least one processor, cause the second device at least to: transmit a channel state information, CSI, configuration to a first device; transmit a reference signal to the first device; and receive, from the first device, a CSI report based on the CSI configuration, the CSI report comprising assistance information on transmission power adjustment for the second device.

In a third aspect, there is provided a method. The method comprises: receiving, at a first device and from a second device, a channel state information, CSI, configuration; and in response to receiving a reference signal from the second device, transmitting to the second device a CSI report based on the CSI configuration, the CSI report comprising assistance information on transmission power adjustment for the second device.

In a fourth aspect, there is provided a method. The method comprises: transmitting, at a second device, a channel state information, CSI, configuration to a first device; transmitting a reference signal to the first device; and receiving, from the first device, a CSI report based on the CSI configuration, the CSI report comprising assistance information on transmission power adjustment for the second device.

In a fifth aspect, there is provided a first apparatus. The first apparatus comprises: means for receiving, from a second apparatus, a channel state information, CSI, configuration; and means for in response to receiving a reference signal from the second device, transmitting to the second apparatus a CSI report based on the CSI configuration, the CSI report comprising assistance information on transmission power adjustment for the second apparatus.

In a sixth aspect, there is provided a second apparatus. The second apparatus comprises: means for transmitting a channel state information, CSI, configuration to a first apparatus; transmitting a reference signal to the first apparatus; and receiving, from the first apparatus, a CSI report based on the CSI configuration, the CSI report comprising assistance information on transmission power adjustment for the second apparatus.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
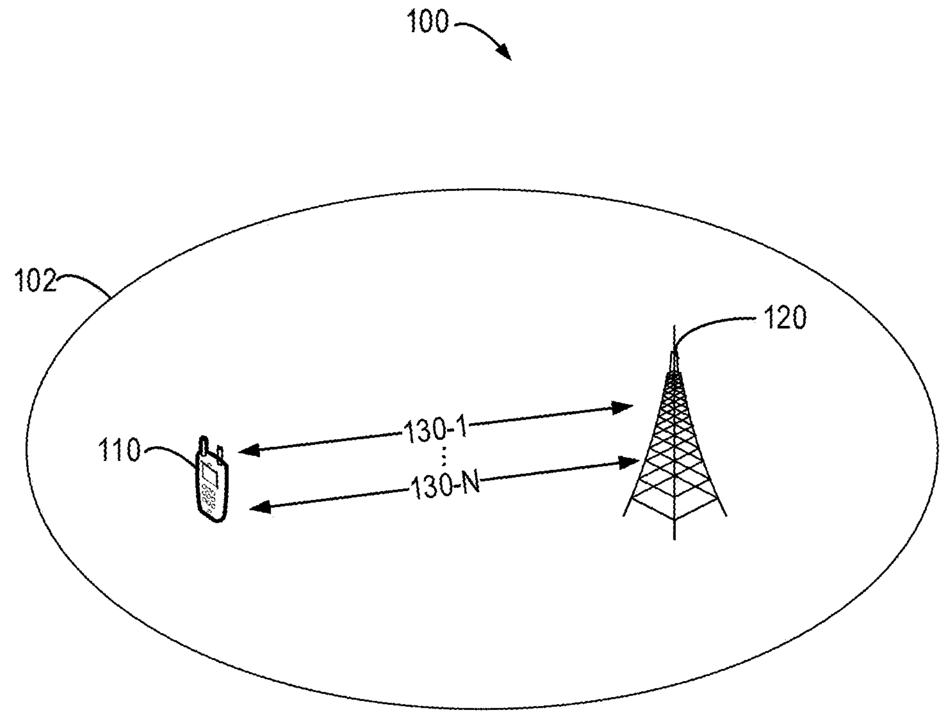
FIG. 1 illustrates an example network system in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or"includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms “terminal device”, “communication device”, “terminal”, “user equipment”and “UE”may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

In fact, reducing the DL transmission power implies a need to reduce the Modulation and Coding Scheme (MCS) of scheduled resources, for example, PRBs of the PDSCH to achieve the desired target block error rate (BLER). Thus, a smaller spectral efficiency can be obtained for the UE, and in turn a larger bandwidth may be used by the network, if available. This may compensate for the spectral efficiency loss and then avoid the increased data latency. Larger bandwidth assignments per UE may be available depending on the load level.

The UE reports the CSI to provide the network with information about the current channel conditions. Based on the CSI report, the gNB performs DL channel-dependent scheduling accordingly, including but not limited to selecting the DL transmission configuration and related parameters depending on the instantaneous DL channel condition, including the interference situation. For example, the gNB’s link adaptation determines a proper MCS and number of Multi-input Multi-output (MIMO) layers for the UE. The gNB can optimize the transmission parameters on its own based on the CSI report, and to enable that information about the actual MCS used for the downlink shared channel (DL-SCH) transmission as well as a set of PRBs used for the transmission is always included in the downlink scheduling assignment.

The CSI consists of one or more pieces of information. In particular, the CSI report in 5G NR may include:

Channel Quality Information (CQI), which represents the highest MCS that, if used, would mean a DL-SCH transmission using the recommended rank indicator (RI) and precoding matrix indicator (PMI) would be received with a block-error probability of at most 10% typically;

PMI, which indicates a preferred precoder to use for DL-SCH transmission, conditioned on the number of layers indicated by the RI. The recommended precoder is not explicitly signaled but provided as an index into a set of predefined matrices, a so-called codebook;

CSI-RS Resource Indicator (CRI), which indicates the beam that the UE prefers in case the device is configured to monitor multiple beams;

SS/PBCH Resource Block Indicator (SSBRI);

Layer Indicator (LI) that identifies the strongest layer from the set of layers indicated by the reported RI;

RI that provides a recommendation on the transmission rank to use, indicating the number of MIMO layers, i.e., the number of independent communication channels that should preferably be used for PDSCH transmission to the device. To compute RI, the UE computes the singular values of the channel co-variance matrix and the Rank is then the number of singular values which are larger than a certain pre-determined threshold. The Rank indicates the number of relatively uncorrelated data streams which can be spatially multiplexed through the MIMO channel between the transmit and receive antennas. The singular values are indicative of the power of each stream. The maximum RI is the number of antennas on each side if the number of transmitting antenna and receiving antenna is the same. If the numbers of transmitting antenna and receiving antenna are different, the maximum achievable RI is equal to the smaller of the two numbers;

Layer 1 reference signal received power (L1-RSRP), which is as part of the support for beam management, and reflects the fact that the reporting does not include the more long-term (e.g., layer-3 or L3) filtering applied for the higher-layer RSRP reporting. L1-RSRP for beam management can be based on measurements on either a set of SS blocks or a set of CSI-RS. In the case of L1-RSRP measurements based on CSI-RS, the CSI-RS should be limited to single-port or dual-port CSI-RS. In the latter case, the reported L1-RSRP should be a linear average of the L1-RSRP measured on each port;

Synchronization Signal Reference Signal Received Power (SS-RSRP) that is defined to depend on SS-PBCH-BlockPower. Furthermore, the CSI-RS power can be derived from SS-PBCH-BlockPower and the powerControlOffsetSS. The SS-PBCH-BlockPower is defined to be part of ServingCellConfigCommon (which is part of SIB1) and is in the range [−60: 50] dBm. The powerControlOffsetSS is defined to be the Power offset of NZP CSI-RS RE to SSS RE and is part of the NCP-CSI-RS-Resource and can be set to [−3, 0, 3, 6] dB.

Currently, a power offset between PDSCH and Channel State information-Reference Signal (CSI-RS), which is also called powercontrolOffset in relevant standards, is notified to the UE via Radio Resource Control (RRC) signaling. Practically, a configured value of powercontrolOffset is an assumed ratio at the UE for derivation of the CSI feedback. However, in some cases, the transmission power of PDSCH changes, the transmission power of the CSI-RS does not change accordingly. For example, if CSI-RS resources are shared with more than one UE, then the transmission power of the CSI-RS may not change. As a result, the actual power offset between PDSCH and CSI-RS may be rather different from the configured value of powercontrolOffset. This will have impact on the CSI feedback from the UE, since the UE assumed power offset ratio between PDSCH Energy Per Resource Element (EPRE) and CSI-RS RE is quite different from the UE's actual experienced power offset between PDSCH and CSI-RS.

Although the gNB may compensate for e.g., L1-RSRP and/or CQI reports according to the transmission power difference between actual and the nominal settings, such compensation may not be very accurate. Particularly, the change of transmission power may in addition to CQI and L1-RSRP, also affect RI or PMI from the UE for which the gNB may have major difficulties to compensate. Moreover, the transmission power reduction may cause the supported number of MIMO layers to be reduced. This is counter-productive, as it may decrease significantly the spectral efficiency, and consequently, increase the data latency and overall network energy consumption, In order to solve the above and other potential problems, embodiments of the present disclosure provide a transmission power adaptation mechanism. In the power adaptation mechanism, the UE is able to provide the network with assistance information via the CSI report for adjustment of the transmission power and/or bandwidth assignment. The assistance information indicates how the transmission power reduction may affect the communication quality and performance at UE side, for example, the number of supported MIMO layers, i.e., RI. In this way, the network would benefit from determining the maximum transmission power reduction that can be applied for the UE without degrading the supported MIMO layers.

FIG. 1 illustrates an example network system 100 in which example embodiments of the present disclosure can be implemented. As shown in FIG. 1, the communication network 100 may include a first device 110 and a second device 120. The first device 110 may be a terminal device (e.g., UE). The second device 120 may be a network device (e.g., gNB) serving the terminal devices (e.g., the first device 110) located in the cell 102.

The network system 100 is a MIMO system which uses multiple transmitting antennas and multiple receiving antennas to improve the capacity of radio system and to improve the data transmission efficiency. Based on the transmission rank used in the network system 100, the first device 110 may communicate with the second device 120 via different uncorrelated data streams which are spatially multiplexed through a set of communication channels 130-1 to 130-N (e.g., MIMO channels) between the transmitting and receiving antennas. The number of the communication channels 130-1 to 130-N may depend on MIMO layers for the first device 110. Furthermore, the number of the communication channels 130-1 to 130-N may be indicated by RI.

The first device 110 may measure DL RSs, for example, CSI-RSs in RRC Connected mode, to obtain the CSI. Then, the first device 110 may transmit the CSI report to the second device 120. As the CSI report reflects the current channel conditions, the second device 120 may schedule UL transmissions, implement beam management, adjust the DL transmission power and bandwidth based on the CSI report.

To this end, the second device 120 may provide a CSI configuration to first device 110 in advance. For example, the CSI configuration may be transmitted in an RRC message. In the context of the present disclosure, the term "CSI configuration" refers to parameters or information of CSI measurement and reporting, which may include, but not limited to, CSI-MeasConfig information element (IE), CSI-ReportConfig IE, etc. The CSI-MeasConfig IE is defined for setting CSI resources.

The CSI-MeasConfig IE may configure a power offset of a DL data transmission (e.g., a PDSCH RE) to a CSI-RS transmission (e.g., a NZP CSI-RS RE). Such a power offset may be carried in a powercontrolOffset IE. In some example embodiments, a further power offset may be provided, which is the power offset of a DL data transmission (e.g., a PDSCH RE) to a CSI-RS transmission (e.g., a NZP CSI-RS RE) corresponding to the maximum transmission power reduction that the network can apply for dynamic PDSCH transmission power adaptation, e.g., −10 dB (hereinafter which is also called maxpowercontrolOffset). By way of example, the further power offset in addition to the power offset may be provided in a case of applying dynamic transmission power or bandwidth adaptation. In the following description, the further power offset and the power offset may be referred to as a first power offset and a second power offset, respectively.

The CSI-ReportConfig IE is defined for setting CSI report related configurations, for example, the CSI reporting granularity in frequency domain. In some example embodiments, the CSI-ReportConfig IE may include a reportFreqConfiguration IE differentiated for at least CQI. Accordingly, the first device 110 is configured to report, for example, first CQI measured under the first power offset on the wide band, and/or second CQI measured under the second power offset on at least one sub-band.

In reporting the CSI, in addition to the parameters, such as, CQI, PMI, RI, etc., the first device 110 may also provide assistance information on transmission power adjustment for the second device 120, which will be discussed in detail below. The second device 120 may then perform transmission power/bandwidth adaptation for DL resource (e.g., DL-SCH resources) assignment based on the assistance information. In this case, the first device 110 may apply the transmission power/bandwidth adaptation accordingly, for example, to steer an assumed power offset ratio between PDSCH and NZP CSI-RS for derivation of CSI feedback.

It is to be understood that the number of the network device and the terminal device shown in FIG. 1 is given for the purpose of illustration without suggesting any limitations. The communication network 100 may include any suitable number of network devices and terminal devices.

Depending on the communication technologies, the communication network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Figure 2:
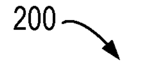
FIG. 2 shows a signaling chart illustrating an example procedure for transmission power adaptation according to some example embodiments of the present disclosure.
Figure 2:
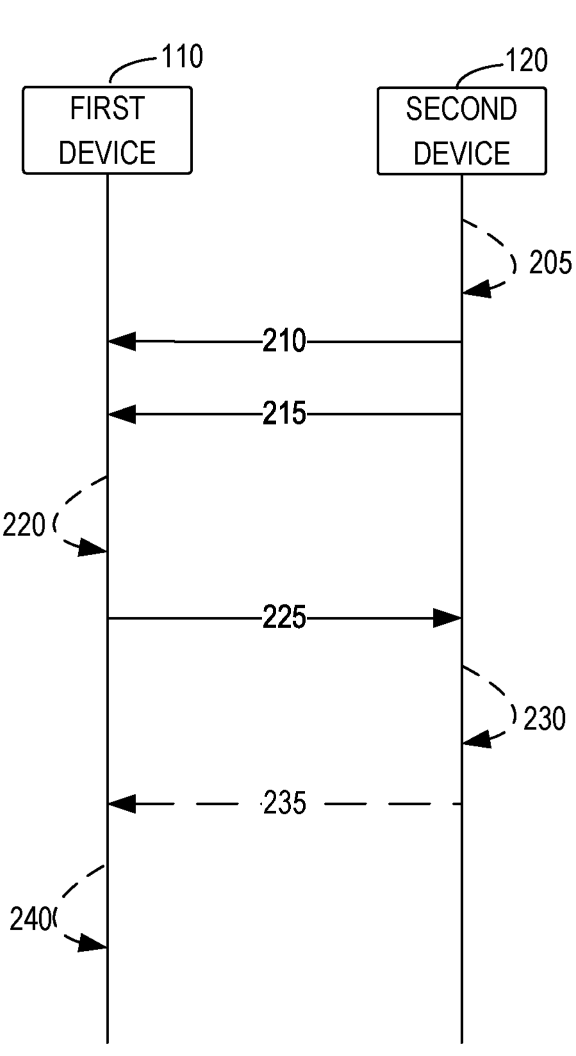

Principle and implementations of the present disclosure will be described in detail below with reference to FIGS. 2 to 4. FIG. 2 shows a signaling chart illustrating an example procedure 200 for transmission power adaptation according to some example embodiments of the present disclosure. The process 200 may involve the first device 110 and the second device 120 as shown in FIG. 1. For discussion, the process 200 will be described with reference to FIG. 1.

In the process 200, the first device 110 may communicate with the second device 120 in RRC_Connected mode. The second device 120 is enabled to apply a dynamic power adjustment for DL transmissions, and possibly to increase the bandwidth with the reduced transmission power, or vice versa.

In some embodiments, the second device 120 may determine 205 to apply transmission power adaptation or bandwidth adaptation. By way of example, the transmission power/bandwidth adaptation may include a DL transmission power reduction, and thus an actual power offset between the PDSCH and CSI-RS may be changed.

The second device 120 may transmit 210 at least one CSI configuration to the first device 110. For example, the CSI configuration may be transmitted in a RRC message (e.g., a RRC setup message). In some example embodiments, the CSI configuration may include, but not limited to, the CSI-MeasConfig IE, the CSI-ReportConfig IE and so on. In particular, the CSI-MeasConfig IE may include a powercontrolOffset IE that indicates a power offset of a DL data transmission (e.g., a PDSCH RE) to a reference signal transmission (e.g., a NZP CSI-RS RE). The CSI-ReportConfig IE may include a reportFreqConfiguration IE that is differentiated for at least CQI.

Due to the power/bandwidth adaptation, the actual power offset experienced by the first device 110 may be different from the indicated power offset. In some embodiment, the CSI-MeasConfig IE may further comprise an additional power offset of PDSCH RE to NZP CSI-RS RE that corresponds to the maximum transmission power reduction that the second device 120 can use for dynamic PDSCH transmission power adaptation, e.g., −10 dB, which is also called maxpowercontrolOffset.

In the context of the present disclosure, the maxpowercontrolOffset or the additional power offset may be also referred to as a first power offset, while the indicated power offset may be also referred to as a second power offset. However, it should be understood that the solution provided in the present disclosure is also suitable for a power offset corresponding to an average power reduction, an anticipated power reduction, and so on. Thus, in some other embodiments, the term "first power offset" may be determined based on the average power reduction, the anticipated power reduction, and so on. The scope of the present disclosure is not limited in this regard.

In some embodiments where the CSI configuration includes the first power offset, the first device 110 is configured to report at least one of a first CQI or a second CQI based on the CSI-ReportConfig IE, where the first CQI is measured based on the first power offset, and the second CQI is measured based on the second power offset. Additionally, or alternatively, in some embodiments, if the second device 120 indicates the transmission power adaptation, the first device 110 may always apply a wideband reporting, irrespective of the configuration provided in the RRC signaling. In other words, even if a sub-band reporting is configured in the CSI configuration, the wideband reporting is assumed to be applied.

For enabling the gNB dynamic PDSCH power adjustment, multiple power offset adjustment values may be provided to the UE for using in the network. To this end, in some embodiments, the CSI configuration may include PDSCH power adjustment information, e.g., a set of candidate power offset adjustment values [−6 dB, −3 dB, 0, 1 dB, 3 dB, 6 dB]. The network may dynamically indicate one of those values for PDSCH power adjustment, which will be discussed later.

The second device 120 then transmit 215 a reference signal (e.g., CSI-RS) to the first device 110. The first device 110 may measure the reference signal to determine channel condition parameters, such as CQI, RI, PMI, and so on. These channel condition parameters may be included in a CSI report.

In the context of the present disclosure, a CQI measured based on the first power offset may be also referred to as a first CQI. A CQI measured based on the second power offset may be also referred to as a second CQI. Additionally, a CQI that the first device 110 may support at an indicated RI decreased by 1 may be referred to as a third CQI.

In order to assist the network for transmission power adjustment and/or bandwidth assignment, the CSI report may be extended to provide assistance information. In some embodiments, the assistance information may indicate how much margin the first device 110 has on top of the noise floor level at the given BLER target of, e.g., 10%. The margin may be in dB and reflect the difference between, for example, Signal to Interference plus Noise Ratio (SINR) at a CQI and noise floor. Such assistance information may have at least one of the following forms:

- the First Cqi Measured Based on the First Power Offset,
- a first Signal to Interference plus Noise Ratio (SINR) delta parameter, i.e., a first SINR delta, which may be a SINR difference between the first CQI measured based on the first power offset and a fourth CQI corresponding to a predefined CQI index, such as, CQI index 0, where CQI index 0 is considered to be a most robust CQI index,
- a second SINR delta parameter, i.e., a second SINR delta, which may be a SINR difference between the second CQI measured based on the second power offset and the fourth CQI.

In this case, the CQI may be determined based on the SINR delta, that is, the value of the SINR delta is mapped to the CQI index. Such SINR delta can be used by the network to determine a maximum PDSCH transmission power reduction that can be applied by the network without degrading the number of MIMO layers. The reduction of the transmission power may not exceed the margin indicated by SINR delta, so as to ensure good demodulation performance at the UE.

In some embodiments, the assistance information may include RI information indicating whether or when the transmission power reduction affects the indicated RI. Such assistance information may have at least one of the following forms:

an indication of whether the first device 110 can maintain the indicated RI at the first power offset, a maximum reduced power offset value at which the first device 110 can maintain the indicated RI, the power offset value at which the first device 110 would support the indicated RI decreased by 1, i.e., 1 MIMO layer less than indicated, the third CQI that the first device 110 would support at the indicated RI decreased by 1.

By way of example, a first value of the indication may indicate that the first device 110 can maintain the indicated RI at the first power offset. Additionally, a second value of the indication may indicate that the first device 110 cannot maintain the indicated RI at the first power offset.

The maximum reduced power offset value at which the first device 110 can maintain the indicated RI may depend on how much the weakest layer of the first device 110 is above the noise floor. In case of rank 1, this is equivalent to the first SINR delta.

In some embodiments, the first device 110 may generate 220 the CSI report including the assistance information on transmission power adjustment for the second device 120. In some embodiment, the transmission power adjustment may relate to a number of MIMO layers supported by the first device 110, which is indicated by RI. The number of MIMO layers or the RI may impact a number of communication channels 130-1 to 130-N supported by the first device 110.

The first device 110 then transmits 225 the CSI report to the second device 120 based on the CSI configuration.

In some embodiments, upon receiving the CSI report, the second device 120 may determine 230 transmission power or bandwidth adaptation for DL resource assignment accordingly. By way of example, the second device 120 may determine at least one of a target transmission power or a target bandwidth for the transmission power adjustment based on the assistance information, so that the number of the communication channels 130-1 to 130-N supported by the first device 110 is not reduced. By way of another example, the reduction level of the transmission power may be decided so that the first device 110 would always operate above its noise floor level. For example, the applied reduction in dB is never below the first SINR delta in dB as reported by the first device 110.

In a case where the CSI configuration comprises the set of candidate power offset adjustment values, the second device 120 may select, from the set of candidate power offset adjustment values, a target power offset adjustment value corresponding to the at least one of target transmission power or the target bandwidth. The second device 120 may then transmit 235 an indication of the target power offset adjustment value to the first device 110. For example, the indication of the target power offset adjustment value may be transmitted via a DCI, a MAC CE, or a DL grant.

Upon receipt of the indication, the first device 110 may apply 240 the power offset adjustment value on top of the power offset configured via the powercontrolOffset IE. In particular, the first device 110 may steer the power offset ratio between the PDSCH and NZP CSI-RS in derivation of the CSI feedback.

In some embodiments, the first device 110 may determine a third power offset based on the second power offset and the indicated power offset adjustment value. Upon receiving a further reference signal, the first device 110 may transmit a further CSI report to the second device 120, and in this case, the further CSI report includes at least one channel condition parameter measured based on the third power offset.

It should be understood that some of the steps in process 200 is optional or can be omitted, and the order of the steps is given for an illustrative purpose. For example, step 205 may be optional for the process 200. In some embodiments, the step 205 may be omitted, or performed in parallel with other steps. Thus, the embodiments of the present disclosure are not limited in this regard.

According to the example embodiments of the present disclosure, the CSI reporting is enhanced on providing assistance information for transmission power adaptation. Based on the assistance information, the gNB is aware of how the transmission power reduction would affect the number of supported MIMO layers or the RI. Thus, the gNB benefits from determining the maximum transmission power reduction that can be applied for the UE without degrading the supported MIMO layers. In this way, the spectral efficient is improved by virtue of transmission power and bandwidth adaptation, while the data latency and an overall network energy consumption are reduced.

Figure 3:
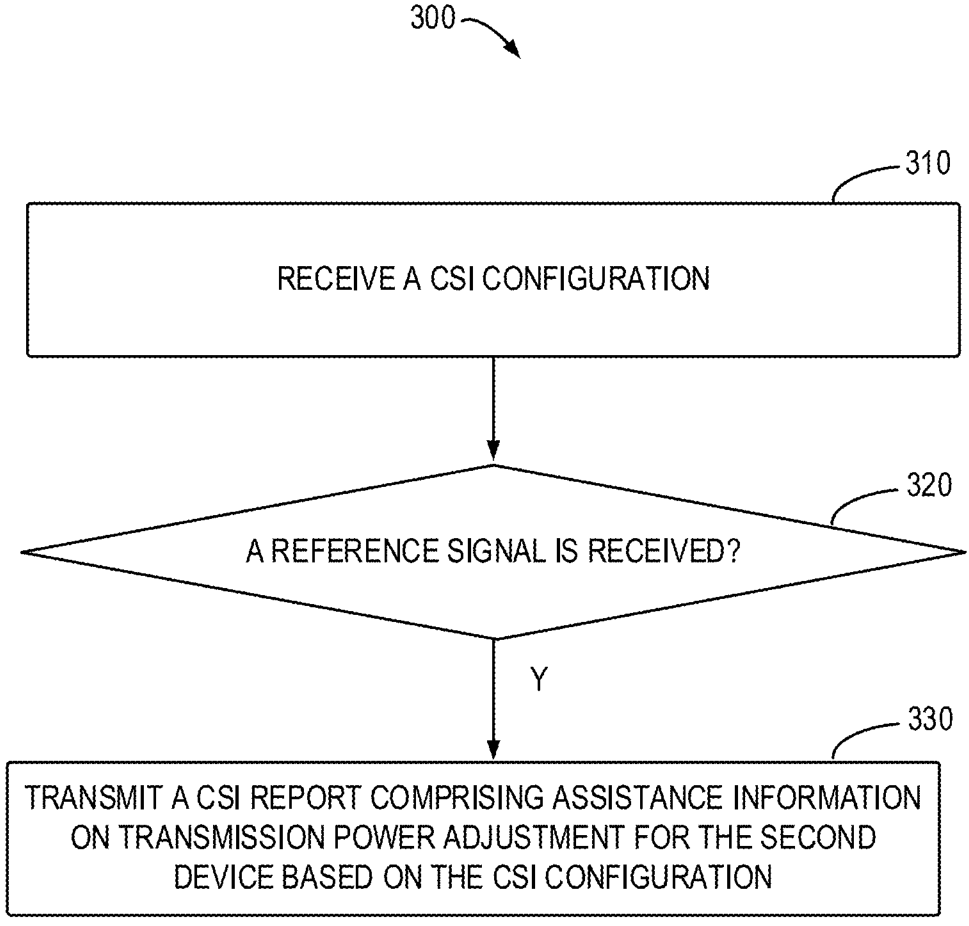
FIG. 3 illustrates a flowchart of an example method according to some example embodiments of the present disclosure.

FIG. 3 illustrates a flowchart of an example method 300 according to some example embodiments of the present disclosure. The method 300 can be implemented at a terminal device, for example, the first device 110 described with reference to FIG. 1. For the purpose of discussion, the method 300 will be described with reference to FIG. 1.

At 310, the first device 110 receives, from the second device 120, a CSI configuration. In some embodiments, the CSI configuration may be received in an RRC message.

At 320, the first device 110 determines whether a reference signal is received from the second device 120. If the reference signal is received, at 330, the first device 110 transmits to the second device 120 a CSI report based on the CSI configuration. The CSI report may comprise assistance information on transmission power adjustment for the second device 120.

In some example embodiments, the transmission power adjustment may relate to a number of MIMO layers supported by the first device 110, or RI supported by the first device 110. The number of MIMO layers or the RI may impact a number of communication channels 130-1 to 130-*n* supported by the first device 110.

In some example embodiments, the CSI configuration may comprise a CSI measurement configuration comprising a first power offset that corresponds to a maximum transmission power reduction supported by the second device 120 and a second power offset between a transmission power of a data transmission from the second device 120 and a transmission power of the reference signal. In other words, the first power offset is an additional power offset of PDSCH RE to NZP CSI-RS RE corresponding to the maximum transmission power reduction that the network can use for dynamic PDSCH transmission power adaptation, e.g., −10 dB. Thus, it may be also called maxpowercontrolOffset. From the first power offset, the first device 110 is able to determine how much margin it has on top of the noise floor level at the given BLER target of, e.g., 10%.

In some example embodiments, the first device 110 may determine whether the CSI measurement configuration comprises the first power offset. If the CSI measurement configuration comprises the first power offset, the first device 110 may transmit the CSI report comprising one of the following: a first CQI measured based on the first power offset, or a second CQI measured based on the second power offset.

In some example embodiments, if the CSI measurement configuration comprises the first power offset, the first device 110 may transmit the CSI report comprising a first CQI measured based on the first power offset and a second CQI measured based on the second power offset.

In some example embodiments, the first power offset may correspond to a wideband reporting of the first CQI.

In some example embodiments, if the second device 120 indicates transmission power adaptation, the first device 110 may always use wideband reporting, irrespective of the configuration provided vian RRC signaling. In particular, the second device 120 may determine whether the CSI measurement configuration comprises the first power offset. If the CSI measurement configuration comprises the first power offset, the first device 110 may transmit the CSI report comprising a wideband CQI, irrespective of a CSI report configuration.

In some example embodiments, the CSI configuration may comprise a CSI report configuration (e.g., CSI-Report-Config IE) that comprises reporting configuration associated with the first power offset, and the first power offset corresponds to a maximum transmission power reduction supported by the second device 120.

In some example embodiments, the CSI configuration may comprise a second power offset between a transmission power of a data transmission from the second device 120 and a transmission power of the reference signal. The assistance information may indicate a margin over a noise floor level for the first device 110 at a predetermined BLER, for exmaple, 10%. In these embodiments, the assistance information may comprise at least one of the following:

- a first CQI measured based on a first power offset corresponding to a maximum transmission power reduction supported by the second device 120,
- a first SINR delta parameter (e.g., SINR delta 1) determined based on a first CQI measured based on the first power offset and a fourth CQI corresponding to a predetermined CQI index, or
- a second SINR delta parameter (e.g., SINR delta 2) determined based on a second CQI measured based on the second power offset and the fourth CQI.

Additionally, in some embodiments, the predetermined CQI index may be CQI index 0, where the CQI index 0 is the most robust CQI index.

In some example embodiments, the CSI report may further comprise a first RI supported by the first device 110 based on a second power offset between a transmission power of a data transmission from the second device 120 and a transmission power of the reference signal (e.g., CSI-RS). The CSI configuration may comprise a first power offset corresponding to a maximum transmission power reduction supported by the second device 120. In these embodiments, the assistance information may comprise RI information comprising at least one of the following:

- an indication of whether the first device 110 supporting the first RI based on the first power offset,
- a maximum reduced power offset for the first device 110 to support the first RI,
- a power offset value for the first device 110 to support a second RI, wherein the second RI is one layer lower than the first RI, or
- a third CQI measured by the first device 110 based on the second RI.

In some example embodiments, the CSI configuration may include a set of candidate power offset adjustment values. By way of example, the CSI configuration may be an RRC-level configuration including PDSCH power adjustment information for configuring a set of power offset adjustment values. The set of power offset adjustment values may be, for example, [−6 dB, −3 dB, 0, 1 dB, 3 dB, 6 dB]. Additionally, in the embodiments, the first device 110 may receive, from the second device 120, an indication of one of the set of candidate power offset adjustment values to be used for the transmission power adjustment. In other words, the second device 120 may dynamically indicate one of the values to be used for PDSCH power adjustment.

In some example embodiments, the indication may be received in at least one of a DCI, a MAC CE or a DL grant.

In some example embodiments where the CSI configuration may comprise a second power offset between a transmission power of a data transmission from the second device 120 and a transmission power of the reference signal, the first device 110 may determine a third power offset based on the second power offset and the indicated power offset adjustment value. The first device 110 may the receive, from the second device 120, a further reference signal. The first device 110 may transmit, to the second device 120, a further CSI report comprising at least one channel condition parameter measured based on the third power offset.

In some example embodiments, the first device 110 may comprise a terminal device (e.g., UE). Additionally, or alternatively, the second device 120 may comprise a network device (e.g., gNB).

Figure 4:
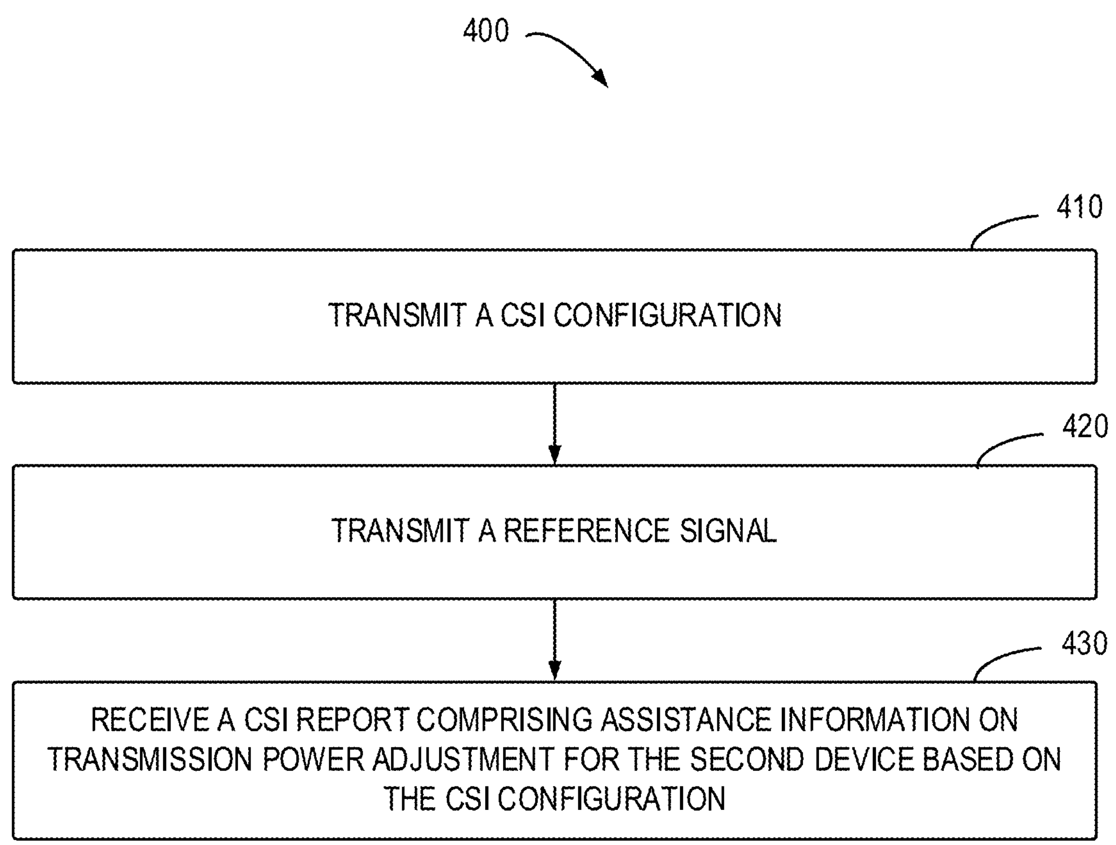
FIG. 4 illustrates a flowchart of another example method according to some example embodiments of the present disclosure.

FIG. 4 illustrates a flowchart of an example method 400 according to some example embodiments of the present disclosure. The method 400 can be implemented at a network, for example, the second device 120 described with reference to FIG. 1. For the purpose of discussion, the method 400 will be described with reference to FIG. 1.

At 410, the second device 120 transmits a CSI configuration to the first device 110. In some example embodiments, the CSI configuration may be transmitted in an RRC message.

At 420, the second device 120 transmits a reference signal to the first device 110. By way of example, in a case where the first device 110 is in an RRC_Connected mode, the reference signal may be the CSI-RS.

At 430, the second device 120 receives, from the first device 110, a CSI report based on the CSI configuration. The CSI report comprises assistance information on transmission power adjustment for the second device 110.

In some example embodiments, the transmission power adjustment may relate to a number of MIMO layers supported by the first device 110, or a RI supported by the first device 110. The number of MIMO layers or the RI may impact a number of communication channels 130-1 to 130-N supported by the first device 110.

In some example embodiments, the CSI configuration may comprise a CSI measurement configuration comprising a first power offset corresponding to a maximum transmission power reduction supported by the second device 120 and a second power offset between a transmission power of a data transmission from the second device 120 and a transmission power of the reference signal. For example, the CSI measurement configuration may be the CSI-MeasConfig IE. In this case, in addition to the powerControlOffset IE indicating a second power offset of PDSCH RE to NZP CSI-RS RE, an additional powerControlOffset IE indicating the first power offset of PDSCH RE to NZP CSI-RS RE corresponding to the maximum transmission power reduction that the second device 120 can use for dynamic PDSCH transmission power adaptation is carried in the CSI-MeasConfig IE. A value of the first power offset may be, for example, −10 dB, which is also called a maxpowercontrolOffset IE.

In some example embodiments, the CSI configuration may comprise a CSI report configuration comprising reporting configuration associated with a first power offset, and the first power offset may correspond to a maximum transmission power reduction supported by the second device 120. For example, the CSI report configuration may be the CSI-ReportCongif IE that includes a reportFreqConfiguration IE differentiated for at least CQI. In this case, the first device 110 is configured to report a first CQI measured on the wideband based on the first power offset, and additionally, a second CQI measured on the sub-band based on the second power offset.

In some example embodiments, the second device 120 may receive the CSI report comprising at least one of the following: a first CQI measured based on the first power offset, or a second CQI measured based on the second power offset.

The CSI measurement configuration and the CSI report configuration may be transmitted in an RRC message. By way of example, both of the configurations may be configured in RRC Connection Setup procedure via an RRC Setup message.

In some example embodiments, if the second device indicates the transmission power adaptation is applied, the first device 110 may always use the wideband reporting granularity irrespective of the CSI report configuration provided via the RRC signaling.

In some example embodiments, the first power offset may correspond to a wideband reporting of the first CQI.

In some example embodiments, the assistance information may comprise information about a margin over a noise floor level at a predetermined block error rate.

In some example embodiments, the assistance information may comprise at least one of the following:

- a first CQI measured based on a first power offset corresponding to a maximum transmission power reduction supported by the second device 120;
- a first SINR delta parameter determined based on a first CQI measured based on the first power offset and a fourth CQI corresponding to a predetermined CQI index, or
- a second SINR delta parameter determined based on a second CQI measured based on the second power offset and the fourth CQI.

Additionally, in some embodiments, the predetermined CQI index may be CQI index 0, where the CQI index 0 is the most robust CQI index.

In the context of the present disclosure, such SINR parameters may be also referred to as SINR delta. The SINR delta may be used by the network to determine the maximum PDSCH transmission power reduction that can be applied as compared to the additional powercontrolOffset. The reduction may not be reduced more than the reported margin, i.e., SINR delta, to ensure good demodulation performance at the UE.

In some example embodiments, the first device 110 may provide additional RI information indicating whether or when the transmission power reduction affects the RI indicated by the second device 120. In these embodiments, the CSI report may further comprise a first RI supported by the first device 110 based on a second power offset between a transmission power of a data transmission from the second device 120 and a transmission power of the reference signal. The CSI configuration may comprise the first power offset corresponding to the maximum transmission power reduction supported by the second device 120. Additionally, the assistance information may comprise RI information comprising at least one of the following:

- an indication of the first device 110 whether supporting the first RI based on the first power offset; by way of example, a first value of the indication may indicate the first device 110 supports the first RI based on the first power offset, while a second value of the indication may indicate the first device 110 does not support the first RI based on the first power offset;
- a maximum reduced power offset for the first device to support the first RI,
- a power offset value for the first device to support a second RI, wherein the second RI is one layer lower than the first RI, or
- a third CQI measured by the first device based on the second RI.

Based on the value of the indication, the second device 120 may be aware of whether the first device 110 can maintain the indicated RI at the first power offset. The maximum reduced power offset value at which the first device 110 can maintain the indicated RI may depend on the margin of the weakest layer for the first device 110 above the noise floor. In case of Rank 1, the maximum reduced power offset may be equivalent to the SINR delta.

In some example embodiments where the dynamic PDSCH power adjustment is applied, multiple power offset adjustment values may be configured to the UE and used in the network. In this end, the CSI configuration may comprise a set of candidate power offset adjustment values to the first device 110. The CSI configuration may be an RRC-level configuration including PDSCH power adjustment information, e.g., a set of candidate power offset adjustment values [−6 dB, −3 dB, 0, 1 dB, 3 dB, 6 dB]. In these embodiments, the second device 120 may transmit, to the first device 110, an indication of one of the set of candidate power offset adjustment values to be used for the transmission power adjustment.

In the above example, the network then dynamically indicates one of the values [−6 dB, −3 dB, 0, 1 dB, 3 dB, 6 dB] to be used for PDSCH power adjustment, for example, via a DCI or a MAC CE. As an example, the indicated value, which is also called a target power offset adjustment value, may be included in the DL grant. Accordingly, the first device 110 may apply the indicated PDSCH power adjustment value, which may be received via the DCI or MAC CE on top of the configured powerControlOffset, to steer the assumed power offset ratio delta difference between PDSCH EPRE and NZP CSI-RS EPRE when deriving the CSI feedback.

The serving gNB or cell may determine and provision the extended CSI configuration for the UE. The gNB may then perform dynamic PDSCH power adjustment for the UE based on the extended CSI report received from the UE. The transmission power reduction level is decided so that it lets the UE always operate above its noise floor level. For example, the applied reduction in dB is never below the SINR delta in dB reported by the UE.

Accordingly, in some embodiments, the second device 120 may determine, based on the assistance information, at least one of a target transmission power or a target bandwidth for the transmission power adjustment, so that the number of the communication channels is supported by the first device 110. The second device 110 may select, from the set of candidate power offset adjustment values, a target power offset adjustment value corresponding to the at least one of target transmission power or the target bandwidth. Then, the second device 120 may transmit, to the first device 110, the indication of the target power offset adjustment value.

In some example embodiments, the indication may be transmitted in one of a DCI, a MAC CE, or a DL grant.

In some example embodiments, the second device 120 may transmit, to the first device 110, a further reference signal corresponding to a third power offset. The third power offset is determined based on the indicated power offset adjustment value and a second power offset indicated in the CSI configuration. The second device 120 may receive, from the first device 110, a further CSI report comprising at least one channel condition parameter measured based on the third power offset.

In some example embodiments, the first device 110 may comprise a terminal device (e.g., UE). Additionally, or alternatively, the second device 120 may comprise a network device (e.g., gNB).

According to the embodiments of the present disclosure, the UE is able to provide efficient feedback or assistance information for adjustment of transmission power and/or joint adjustments of transmission power and bandwidth in the CSI report. This allows the network to be aware of how the transmission power reduction will affect the receiving performance at the UE, for example, the number of supported MIMO layers, i.e., RI. As a result, the maximum transmission power reduction that can be applied without degrading the supported MIMO layers can be determined. With the transmission power adaptation mechanism, a spectral efficiency is improved, and the data latency and overall network energy consumption are reduced.

In some example embodiments, a first apparatus capable of performing the method 300 (for example, the first device 110) may comprise means for performing the respective steps of the method 300. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the apparatus.

In some example embodiments, the first apparatus further comprises: means for receiving, from a second apparatus, a channel state information, CSI, configuration; and means for in response to receiving a reference signal from the second apparatus, transmitting to the second apparatus a CSI report based on the CSI configuration, the CSI report comprising assistance information on transmission power adjustment for the second apparatus.

In some example embodiments, the transmission power adjustment relates to a number of multiple input multiple output layers supported by the first apparatus, or a rank indicator supported by the first apparatus.

In some example embodiments, the channel state information configuration comprises a channel state information measurement configuration comprising a first power offset corresponding to a maximum transmission power reduction supported by the second apparatus and a second power offset between a transmission power of a data transmission from the second apparatus and a transmission power of the reference signal.

In some example embodiments, the means for transmitting the channel state information report: means for in accordance with a determination that the channel state information measurement configuration comprises the first power offset, transmitting the channel state information report comprising one of the following: a first channel quality indicator measured based on the first power offset, a second channel quality indicator measured based on the second power offset.

In some example embodiments, means for transmitting the channel state information report: means for in accordance with a determination that the channel state information measurement configuration comprises the first power offset, transmitting the channel state information report comprising a first channel quality indicator measured based on the first power offset, and a second channel quality indicator measured based on the second power offset.

In some example embodiments, the first power offset corresponds to a wideband reporting of the first channel quality indicator.

In some example embodiments, the assistance information comprises information about a margin over a noise floor level at a predetermined block error rate.

In some example embodiments, the assistance information comprises at least one of the following:

a first channel quality indicator measured based on a first power offset corresponding to a maximum transmission power reduction supported by the second apparatus, a first signal to interference plus noise ratio delta parameter determined based on a first channel quality indicator measured based on the first power offset and a fourth channel quality indicator corresponding to a predetermined channel quality indicator index, or a second signal to interference plus noise ratio delta parameter determined based on a second channel quality indicator measured based on the second power offset and the fourth channel quality indicator.

In some example embodiments, the channel state information report further comprises a first rank indicator supported by the first apparatus based on a second power offset between a transmission power of a data transmission from the second apparatus and a transmission power of the reference signal, the channel state information configuration comprises a first power offset corresponding to a maximum transmission power reduction supported by the second apparatus. The assistance information comprises rank indicator information comprising at least one of the following:

a first indication of the first apparatus supporting the first rank indicator based on the first power offset, or a second indication of the first apparatus not to support the first rank indicator based on the second power offset, a maximum reduced power offset for the first apparatus to support the first rank indicator, a power offset value for the first apparatus to support a second rank indicator, the second rank indicator being one layer lower than the first rank indicator, or a third channel quality indicator measured by the first apparatus based on the second RI.

In some example embodiments, the channel state information configuration comprises a set of candidate power offset adjustment values. The first apparatus further comprises: means for receiving, from the second apparatus, an indication of one of the set of candidate power offset adjustment values to be used for the transmission power adjustment.

In some example embodiments, the indication is received in one of the following:

a downlink control information, a medium access control control element, or a downlink grant.

In some example embodiments, the channel state information configuration comprises a second power offset between a transmission power of a data transmission from the second apparatus and a transmission power of the reference signal. The first apparatus further comprises: means for determining a third power offset based on the second power offset and the indicated power offset adjustment value; means for receiving, from the second apparatus, a further reference signal; and means for transmitting, to the second apparatus, a further channel state information report comprising at least one channel condition parameter measured based on the third power offset.

In some example embodiments, the channel state information configuration is received in a radio resource control message.

In some example embodiments, the first apparatus further comprises a terminal device, and the second apparatus comprises a network device.

In some example embodiments, a second apparatus capable of performing the method 400 (for example, the second device 120) may comprise means for performing the respective steps of the method 400. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the apparatus.

In some example embodiments, the second apparatus comprises: means for transmitting a channel state information, CSI, configuration to a first apparatus; means for transmitting a reference signal to the first apparatus; and means for receiving, from the first apparatus, a CSI report based on the CSI configuration, the CSI report comprising assistance information on transmission power adjustment for the second apparatus.

In some example embodiments, the transmission power adjustment relates to a number of multiple input multiple output layers supported by the first apparatus, or a rank indicator supported by the first apparatus.

In some example embodiments, the channel state information configuration comprises a channel state information measurement configuration comprising a first power offset corresponding to a maximum transmission power reduction supported by the second apparatus and a second power offset between a transmission power of a data transmission from the second apparatus and a transmission power of the reference signal.

In some example embodiments, the means for receiving the channel state information report comprises: means for receiving the channel state information report comprising at least one of the following: a first channel quality indicator measured based on the first power offset, a second channel quality indicator measured based on the second power offset.

In some example embodiments, the first power offset corresponds to a wideband reporting of the first channel quality indicator.

In some example embodiments, the assistance information comprises information about a margin over a noise floor level at a predetermined block error rate.

In some example embodiments, the assistance information comprises at least one of the following:

a first channel quality indicator measured based on a first power offset corresponding to a maximum transmission power reduction supported by the second apparatus, a first signal to interference plus noise ratio delta parameter determined based on a first channel quality indicator measured based on the first power offset and a fourth channel quality indicator corresponding to a predetermined channel quality indicator index, or a second signal to interference plus noise ratio delta parameter determined based on a second channel quality indicator measured based on the second power offset and the fourth channel quality indicator.

In some example embodiments, the channel state information report further comprises a first rank indicator supported by the first apparatus based on a second power offset between a transmission power of a data transmission from the second apparatus and a transmission power of the reference signal, the channel state information configuration comprises a first power offset corresponding to a maximum transmission power reduction supported by the second apparatus. The assistance information comprises rank indicator information comprising at least one of the following:

a first indication of the first apparatus supporting the first rank indicator based on the first power offset, or a second indication of the first apparatus not to support the first rank indicator based on the second power offset, a maximum reduced power offset for the first apparatus to support the first rank indicator, a power offset value for the first apparatus to support a second rank indicator, the first rank indicator being larger than the second rank indicator, or a second channel quality indicator measured by the first apparatus based on the second rank indicator.

In some example embodiments, the channel state information configuration comprises a set of candidate power offset adjustment values. The second apparatus further comprises: means for transmitting, to the first apparatus, an indication of one of the set of candidate power offset adjustment values to be used for the transmission power adjustment.

In some example embodiments, the indication is transmitted in one of the following:

a downlink control information, a medium access control control element, or a downlink grant.

In some example embodiments, the means for transmitting the indication comprises: means for determining, based on the assistance information, at least one of a target transmission power or a target bandwidth for the transmission power adjustment, so that the number of the communication channels is supported by the first apparatus; means for selecting, from the set of candidate power offset adjustment values, a target power offset adjustment value corresponding to the at least one of target transmission power or the target bandwidth; and means for transmitting, to the first apparatus, an indication of the target power offset adjustment value.

In some example embodiments, the second apparatus further comprises: means for transmitting, to the first apparatus, a further reference signal based on a third power offset, wherein the third power offset is determined based on the indicated power offset adjustment value and a second power offset indicated in the channel state information configuration; and means for receiving, from the first apparatus, a further channel state information report comprising at least one channel condition parameter measured based on the third power offset.

In some example embodiments, the channel state information configuration is transmitted in a radio resource control message.

In some example embodiments, the first apparatus comprises a terminal device, and the second apparatus comprises a network device.

Figure 5:
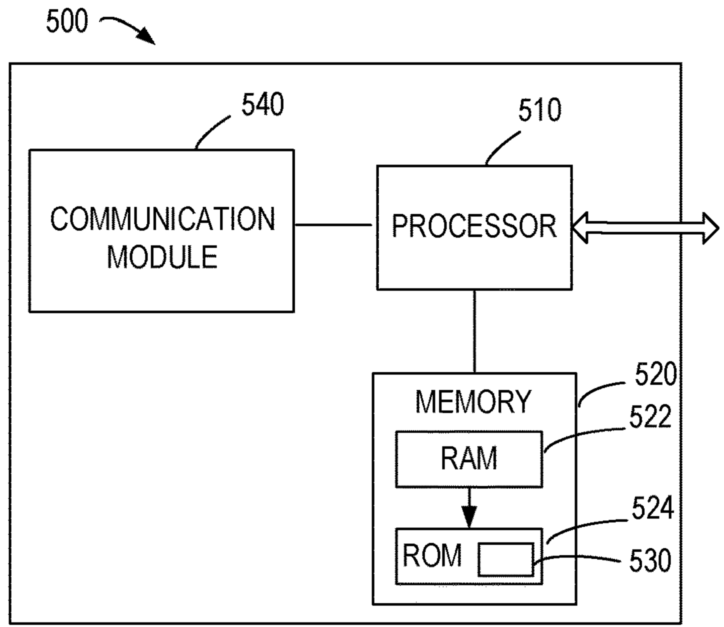
FIG. 5 shows a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the first device 110 or the second device 120 as shown in FIG. 1. As shown, the device 500 includes one or more processors 510, one or more memories 520 coupled to the processor 510, and one or more transmitters and/or receivers (TX/RX) 540 (i.e., the communication module 540) coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIGS. 2-4. The embodiments of the present disclosure may also be implemented by hardware or by a combination of software and hardware.

Figure 6:
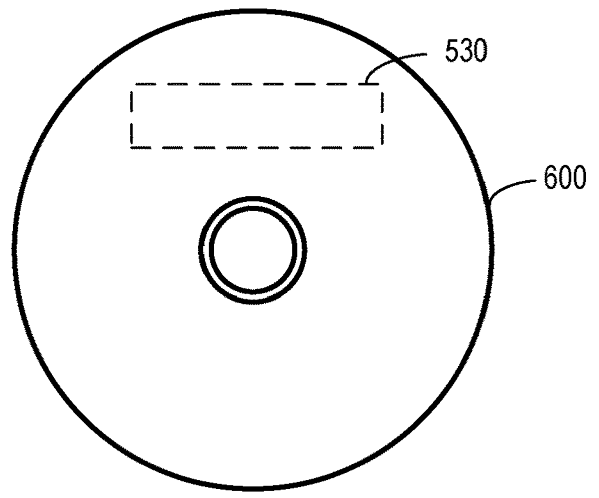
FIG. 6 shows a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIGS. 3 to 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory storing instructions that, when executed with the at least one processor, cause the first device at least to:

receive, from a second device, a channel state information configuration, the channel state information configuration comprises a channel state information measurement configuration comprising a first power offset corresponding to a maximum transmission power reduction supported with the second device and a second power offset between a transmission power of a data transmission from the second device and a transmission power of a reference signal; and in response to receiving the reference signal from the second device, transmit to the second device a channel state information report based on the channel state information configuration, the channel state information report comprising assistance information on transmission power adjustment for the second device.

2. The first device of claim 1, wherein the transmission power adjustment relates to a number of multiple input multiple output layers supported with the first device, or a rank indicator supported with the first device.

3. The first device of claim 1, wherein when transmitting the channel state information report, the instructions, when executed with the at least one processor, cause the first device to transmit the channel state information report with:

in accordance with a determination that the channel state information measurement configuration comprises the first power offset, transmitting the channel state information report comprising one of the following:

a first channel quality indicator measured based on the first power offset, or a second channel quality indicator measured based on the second power offset.

4. The first device of claim 3, wherein the first power offset corresponds to a wideband reporting of the first channel quality indicator.

5. The first device of claim 1, wherein when transmitting the channel state information report, the instructions, when executed with the at least one processor, cause the first device to transmit the channel state information report with:

in accordance with a determination that the channel state information measurement configuration comprises the first power offset, transmitting the channel state information report comprising a first channel quality indicator measured based on the first power offset, and a second channel quality indicator measured based on the second power offset.

6. The first device of claim 1, wherein the assistance information comprises information about a margin over a noise floor level at a predetermined block error rate.

7. The first device of claim 6, wherein the assistance information comprises at least one of the following:

a first channel quality indicator measured based on a first power offset corresponding to a maximum transmission power reduction supported with the second device, a first signal to interference plus noise ratio delta parameter determined based on a first channel quality indicator measured based on the first power offset and a fourth channel quality indicator corresponding to a predetermined channel quality indicator index, or a second signal to interference plus noise ratio delta parameter determined based on a second channel quality indicator measured based on the second power offset and the fourth channel quality indicator.

8. The first device of claim 1, wherein the channel state information report further comprises a first rank indicator supported with the first device based on a second power offset between a transmission power of a data transmission from the second device and a transmission power of the reference signal, the channel state information configuration comprises a first power offset corresponding to a maximum transmission power reduction supported with the second device, and wherein the assistance information comprises rank indicator information comprising at least one of the following:

a first indication of the first device supporting the first rank indicator based on the first power offset, or a second indication of the first device not to support the first rank indicator based on the second power offset, a maximum reduced power offset for the first device to support the first rank indicator, a power offset value for the first device to support a second rank indicator, the second rank indicator being one layer lower than the first rank indicator, or a third channel quality indicator measured with the first device based on the second rank indicator.

9. The first device of claim 1, wherein the channel state information configuration comprises a set of candidate power offset adjustment values, and wherein the instructions, when executed with the at least one processor, further cause the first device to:

receive, from the second device, an indication of one of the set of candidate power offset adjustment values to be used for the transmission power adjustment.

10. The first device of claim 9, wherein the indication is received in one of the following:

a downlink control information, a medium access control control element, or a downlink grant.

11. The first device of claim 9, wherein the channel state information configuration comprises a second power offset between a transmission power of a data transmission from the second device and a transmission power of the reference signal, and wherein the instructions, when executed with the at least one processor, further cause the first device to:

determine a third power offset based on the second power offset and the indicated power offset adjustment value;

receive, from the second device, a further reference signal; and transmit, to the second device, a further channel state information report comprising at least one channel condition parameter measured based on the third power offset.

12. The first device of claim 1, wherein the instructions, when executed with the at least one processor, cause the channel state information configuration to be received in a radio resource control message.

13. The first device of claim 1, wherein the first device comprises a terminal device, and the second device comprises a network device.

14. A second device, comprising:

at least one processor; and at least one memory storing instructions that, when executed with the at least one processor, cause the second device at least to:

transmit a channel state information configuration to a first device, the channel state information configuration comprises a channel state information measurement configuration comprising a first power offset corresponding to a maximum transmission power reduction supported with the second device and a second power offset between a transmission power of a data transmission from the second device and a transmission power of a reference signal;

transmit the reference signal to the first device; and receive, from the first device, a channel state information report based on the channel state information configuration, the channel state information report comprising assistance information on transmission power adjustment for the second device.

15. The second device of claim 14, wherein the transmission power adjustment relates to a number of multiple input multiple output layers supported with the first device, or a rank indicator supported with the first device.

16. The second device of claim 14, wherein when receiving the channel state information report, the instructions, when executed with the at least one processor, cause the second device to receive the channel state information report with:

receiving the channel state information report comprising at least one of the following:

a first channel quality indicator measured based on the first power offset, or a second channel quality indicator measured based on the second power offset.

17. The second device of claim 16, wherein the first power offset corresponds to a wideband reporting of the first channel quality indicator.

18. The second device of claim 14, wherein the assistance information comprises information about a margin over a noise floor level at a predetermined block error rate.

19. The second device of claim 18, wherein the assistance information comprises at least one of the following:

a first channel quality indicator measured based on a first power offset corresponding to a maximum transmission power reduction supported with the second device, a first signal to interference plus noise ratio delta parameter determined based on a first channel quality indicator measured based on the first power offset and a fourth channel quality indicator corresponding to a predetermined channel quality indicator index, or a second signal to interference plus noise ratio delta parameter determined based on a second channel quality indicator measured based on the second power offset and the fourth channel quality indicator.

20. The second device of claim 14, wherein the channel state information report further comprises a first rank indicator supported with the first device based on a second power offset between a transmission power of a data transmission from the second device and a transmission power of the reference signal, the channel state information configuration comprises a first power offset corresponding to a maximum transmission power reduction supported with the second device, and wherein the assistance information comprises rank indicator information comprising at least one of the following:

a first indication of the first device supporting the first rank indicator based on the first power offset, or a second indication of the first device not to support the first rank indicator based on the second power offset, a maximum reduced power offset for the first device to support the first rank indicator, a power offset value for the first device to support a second rank indicator, the first rank indicator being larger than the second rank indicator, or a second channel quality indicator measured with the first device based on the second rank indicator.

21. The second device of claim 14, wherein the channel state information configuration comprises a set of candidate power offset adjustment values, and wherein the instructions, when executed with the at least one processor, further cause the second device to:

transmit, to the first device, an indication of one of the set of candidate power offset adjustment values to be used for the transmission power adjustment.

22. The second device of claim 21, wherein the indication is transmitted in one of the following:

a downlink control information, a medium access control control element, or a downlink grant.

23. The second device of claim 21, wherein when transmitting the indication, the instructions, when executed with the at least one processor, cause the second device to transmit the indication with:

determining, based on the assistance information, at least one of a target transmission power or a target bandwidth for the transmission power adjustment, so that the number of the communication channels is supported with the first device;

selecting, from the set of candidate power offset adjustment values, a target power offset adjustment value corresponding to the at least one of target transmission power or the target bandwidth; and transmitting, to the first device, an indication of the target power offset adjustment value.

24. The second device of claim 21, wherein the instructions, when executed with the at least one processor, further cause the second device to:

transmit, to the first device, a further reference signal based on a third power offset, wherein the third power offset is determined based on the indicated power offset adjustment value and a second power offset indicated in the channel state information configuration; and receive, from the first device, a further channel state information report comprising at least one channel condition parameter measured based on the third power offset.

25. The second device of claim 14, wherein the instructions, when executed with the at least one processor, cause the channel state information configuration to be transmitted in a radio resource control message.

26. The second device of claim 14, wherein the first device comprises a terminal device, and the second device comprises a network device.

27. A method, comprising:

receiving, at a first device and from a second device, a channel state information configuration, the channel state information configuration comprises a channel state information measurement configuration comprising a first power offset corresponding to a maximum transmission power reduction supported with the second device and a second power offset between a transmission power of a data transmission from the second device and a transmission power of a reference signal; and in response to receiving the reference signal from the second device, transmitting to the second device a channel state information report based on the channel state information configuration, the channel state information report comprising assistance information on transmission power adjustment for the second device.

28. A method, comprising:

transmitting, at a second device, a channel state information configuration to a first device, the channel state information configuration comprises a channel state information measurement configuration comprising a first power offset corresponding to a maximum transmission power reduction supported with the second device and a second power offset between a transmission power of a data transmission from the second device and a transmission power of a reference signal;

transmitting the reference signal to the first device; and receiving, from the first device, a channel state information report based on the channel state information configuration, the channel state information report comprising assistance information on transmission power adjustment for the second device.

* * * * *